(12) United States Patent
Miyazaki (10) Patent No.: US 10,136,031 B2
(45) Date of Patent: Nov. 20, 2018

(54) FUNCTION EXECUTION SYSTEM, AND FUNCTION EXECUTION APPARATUS AND COMPUTER-READABLE MEDIUM FOR THE SAME

(71) Applicant: BROTHER KOGYO KABUSHIKI KAISHA, Nagoya, Aichi (JP)

(72) Inventor: Sadaaki Miyazaki, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/380,524

(22) Filed: Dec. 15, 2016

(65) Prior Publication Data

US 2017/0187923 A1 Jun. 29, 2017

(30) Foreign Application Priority Data

Dec. 24, 2015 (JP) .................................. 2015-251759

(51) Int. Cl.
*H04N 1/44* (2006.01)
*H04W 12/06* (2009.01)
(Continued)

(52) U.S. Cl.
CPC .............. *H04N 1/4433* (2013.01); *G06F 3/12* (2013.01); *G06F 9/44505* (2013.01); *H04N 1/00* (2013.01);
(Continued)

(58) Field of Classification Search
None
See application file for complete search history.

(56) References Cited

U.S. PATENT DOCUMENTS

| 2010/0060929 A1* | 3/2010 | Koizumi | G06F 3/1205 358/1.15 |
| 2014/0268203 A1* | 9/2014 | Saotome | H04N 1/00408 358/1.13 |
| 2015/0103376 A1 | 4/2015 | Saeda | |

FOREIGN PATENT DOCUMENTS

JP 2007-301825 A 11/2007

OTHER PUBLICATIONS

Extended European Search Report dated May 11, 2017 from related EP 16205122.1.

* cited by examiner

*Primary Examiner* — Thomas D Lee
(74) *Attorney, Agent, or Firm* — Scully, Scott, Murphy & Presser, PC (57) ABSTRACT

A function execution system includes an information storing device, and a function execution apparatus including a first wireless communication interface, a template information storage configured to store template information, and a controller configured to receive setting information from the information storing device via the first wireless communication interface, the setting information including respective setting values for a plurality of setting items for executing a particular function, generate function execution information by setting the setting information for template information stored in the template information storage, and execute the particular function in accordance with the generated function execution information. The information storing device includes a setting information storage, a second wireless communication interface, and a wireless communication processor configured to transmit the setting information stored in the setting information storage, via the second wireless communication interface.

18 Claims, 7 Drawing Sheets

(51) Int. Cl.
*H04W 4/00* (2018.01)
*H04W 4/80* (2018.01)
*G06F 3/12* (2006.01)
*G06F 9/445* (2018.01)
*H04N 1/00* (2006.01)

(52) U.S. Cl.
CPC ............ *H04N 1/4426* (2013.01); *H04W 4/80* (2018.02); *H04W 12/06* (2013.01); *H04N 2201/0094* (2013.01)

FIG. 1

<PARAMETER INFORMATION (e.g. Scan to FTP)>

```
nf["Script"]="LUA"                                        ···· P04
nf["Function"]="Scan"                                     ···· P01
nf["FunTP"]="<FTPSetting><FtpParameters>
<OutputName>xyzdoc</OutputName>
<HostAddress>xx.xxx.xxx.x</HostAddress>
<UserName>userA</UserName>                                ···· P02
<Pass>123yz</UserName>
<StoredFolder>ftp</StoredFolder>
<PostNumber>yy</PostNumber>
</FtpParameters></FTPSetting>"
nf["DoS"]="A4"
nf["CoM"]="Color"
nf["Res"]="Low"                                           ···· P03
nf["FiT"]="PDF"
nf["DuE"]="false"
```

< TEMPLATE DATA (for SCANNING FUNCTION) >

```
<?xml version="1.0" encoding="utf-8"?>
<AACommands version="1.0">
  <ScanType>                                                          ·········· P11
    <SendingProfile>
      _ScriptBegin(result = nf["FunTP"])_ScriptEnd                    ·········· P12
    </SendingProfile>
    <DocumentSize>_ScriptBegin(result = nf["DoS"])_ScriptEnd</DocumentSize>  ⎫
    <OutputType>_ScriptBegin(result = nf["CoM"])_ScriptEnd</OutputType>      ⎬ ·········· P13
    <Quality>_ScriptBegin(result = nf["Res"])_ScriptEnd</Quality>            ⎪
    <Format>_ScriptBegin(result = nf["FiT"])_ScriptEnd</Format>              ⎪
    <DXSetting>_ScriptBegin(result = nf["DuE"])_ScriptEnd</DXSetting>        ⎭
  </ScanType>
  . . .
</AACommands>
```

FUNCTION EXECUTION SYSTEM, AND FUNCTION EXECUTION APPARATUS AND COMPUTER-READABLE MEDIUM FOR THE SAME

CROSS-REFERENCE TO RELATED APPLICATION

This application claims priority under 35 U.S.C. § 119 from Japanese Patent Application No. 2015-251759 filed on Dec. 24, 2015. The entire subject matter of the application is incorporated herein by reference.

BACKGROUND

Technical Field

The following description relates to aspects of a function execution system including a function execution apparatus configured to execute a function.

Related Art

For a function execution apparatus having a plurality of functions such as a scanning function and a printing function, a plurality of techniques have been proposed to easily execute a function in a user-intended specific method.

For instance, an apparatus has been known that is configured to read parameters for executing a particular function from a mobile device or a card, register the read parameters in a shortcut key, and in response to the shortcut key being operated, execute the particular function based on the registered parameters.

SUMMARY

According to the known apparatus, in order to execute the particular function based on the registered parameters, a user of the apparatus is required to cause the apparatus to read the parameters from the mobile device or the card, and additionally search for the shortcut key associated with the particular function in advance of operating the shortcut key. Thus, as the number of registered shortcuts increases, the user needs to perform more complicated operations.

Aspects of the present disclosure are advantageous to provide one or more improved techniques, for a function execution apparatus, which make it possible to easily execute a function in a specific method.

According to aspects of the present disclosure, a function execution system is provided, which includes an information storing device, and a function execution apparatus including a first wireless communication interface configured to perform near-field wireless communication with the information storing device, using a specific near-field wireless communication protocol, a template information storage configured to store template information, and a controller configured to receive setting information from the information storing device via the first wireless communication interface, the setting information including respective setting values for a plurality of setting items for executing a particular function, generate function execution information by setting the received setting information based on the template information stored in the template information storage, the generated function execution information including the respective setting values set for the plurality of setting items in accordance with a data form of the template information, and execute the particular function in accordance with the generated function execution information. The information storing device includes a setting information storage configured to store the setting information, a second wireless communication interface configured to perform near-field wireless communication with the function execution apparatus, using the specific near-field wireless communication protocol, and a wireless communication processor configured to transmit the setting information stored in the setting information storage, via the second wireless communication interface.

According to aspects of the present disclosure, further provided is a function execution apparatus including a near-field wireless communication interface configured to perform near-field wireless communication with an information storing device, a template information storage configured to store template information, and a controller configured to receive setting information from the information storing device via the near-field wireless communication interface, the setting information including respective setting values for a plurality of setting items for executing a particular function, generate function execution information by setting the received setting information based on the template information stored in the template information storage, the generated function execution information including the respective setting values set for the plurality of setting items in accordance with a data form of the template information, and execute the particular function in accordance with the generated function execution information.

According to aspects of the present disclosure, further provided is a non-transitory computer-readable medium storing computer-readable instructions that are executable by a processor coupled with a function execution apparatus including a near-field wireless communication interface and a template information storage. The instructions are configured to, when executed by the processor, cause the processor to receive setting information from an information storing device via the near-field wireless communication interface according to a specific near-field wireless communication protocol, the setting information including respective setting values for a plurality of setting items for executing a particular function, generate function execution information by setting the received setting information based on template information stored in the template information storage, the generated function execution information including the respective setting values set for the plurality of setting items in accordance with a data form of the template information, and execute the particular function in accordance with the generated function execution information.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

(1) Overview of Function Execution System

Figure 1:
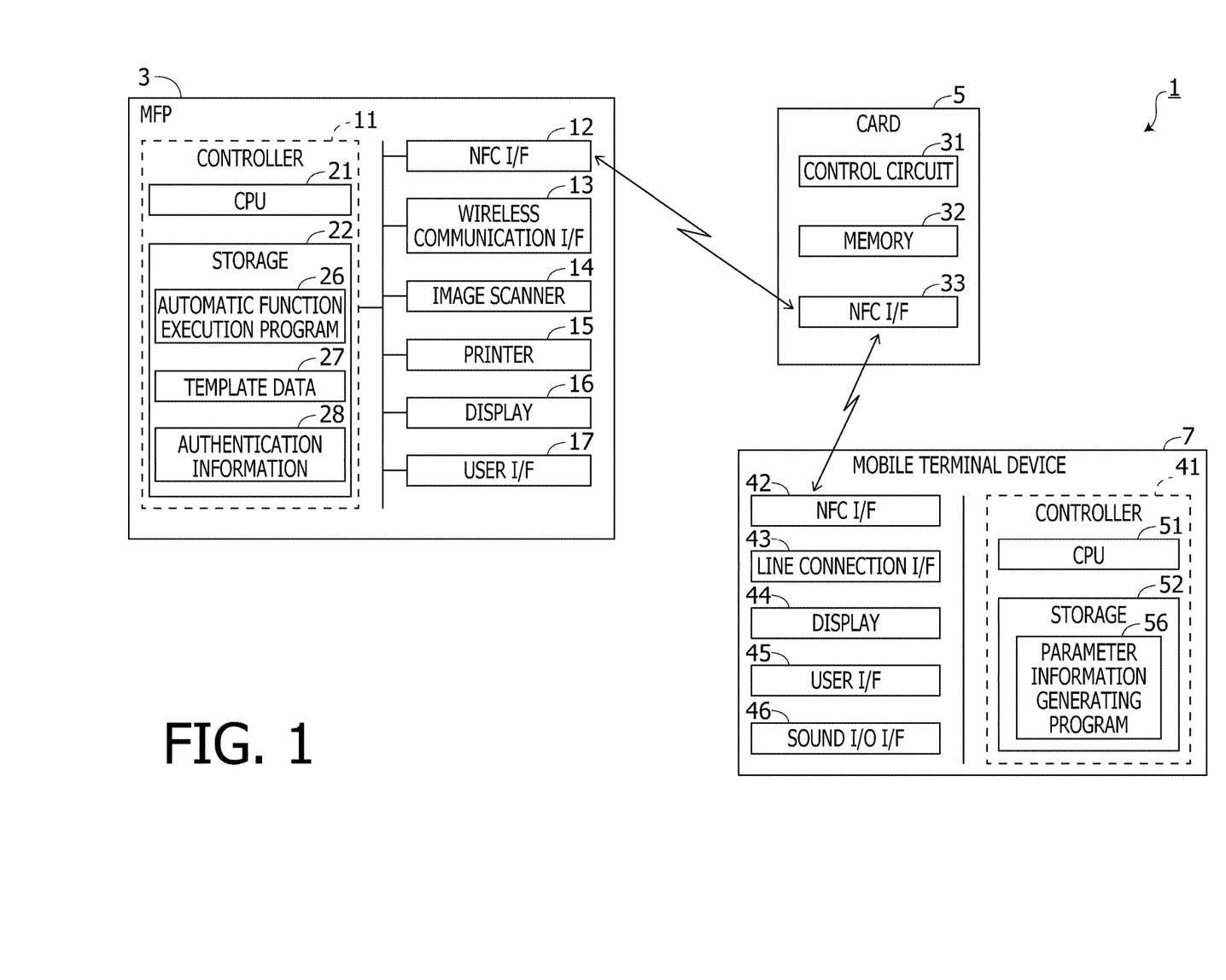
FIG. 1 is a block diagram showing a configuration of a function execution system in an illustrative embodiment according to one or more aspects of the present disclosure.

As shown in FIG. 1, a function execution system of the illustrative embodiment includes a multi-function peripheral (hereinafter referred to as an "MFP") 3, a card 5, and a mobile terminal device 7.

The MFP 3 has a plurality of functions such as a printing function to print an image and a scanning function to scan an image. The MFP 3 is configured to perform near-field wireless communication (hereinafter, which may be referred to as "NFC communication") in accordance with an NFC protocol based on NFC standards. It is noted that "NFC" is an abbreviated form of "Near-Field Communication."

The card 5 is configured to perform NFC communication. Further, the card 5 is configured to store a plurality of parameters as parameter information. The parameters are set to cause the MFP 3 to execute a particular function and indicate specific contents of the particular function. When the card 5 is brought in proximity to the MFP 3, the parameter information stored in the card 5 is transmitted to the MFP 3. When receiving the parameter information from the card 5, the MFP 3 executes the particular function in accordance with the parameter information.

Bringing the card 5 in proximity to a device (hereinafter, which may be referred to as an "NFC device") configured to perform NFC communication specifically denotes bringing the card 5 in proximity to the NFC device such that the card 5 and the NFC device are allowed to perform mutual NFC communication therebetween. It is noted that the MFP 3 is an example of the NFC device.

The mobile terminal device 7 is configured to generate the parameter information and write the parameter information into the card 5. Specifically, the mobile terminal device 7 is configured to perform NFC communication, transmit the generated parameter information to the card 5 via the NFC communication, and write the parameter information into a memory 32 of the card 5.

(2) Configuration of MFP

The MFP 3 includes a controller 11, an NFC interface 12, a wireless communication interface 13, an image scanner 14, a printer 15, a display 16, and a user interface 17.

The NFC interface 12 is configured to perform NFC communication with NFC devices. The MFP 3 is allowed to perform NFC communication with NFC devices such as the card 5 via the NFC interface 12.

The controller 11 includes one or more known microcomputers that include at least a CPU 21 and a storage 22. The storage 22 includes one or more semiconductor memories such as a RAM, a ROM, and a flash memory. Functions of the controller 11 are implemented when the CPU 21 executes one or more programs stored in the storage 22.

It is noted that the functions of the controller 11 may not necessarily be implemented by software. A part or all of the functions of the controller 11 may be implemented by a hardware combination including one or more logic circuits and/or one or more analog circuits.

The storage 22 stores programs and data for implementing the functions of the MFP 3. The programs stored in the storage 22 include an automatic function execution program 26. The data stored in the storage 22 include template data 27 and authentication information 28. In the following description, the CPU 21 executing a program may be referred to as a name of the program. In other words, in the following description, a name of a program may denote the CPU 21 executing the program.

The automatic function execution program 26 is configured to, in response to receiving parameter information from the card 5 via NFC communication, generate a function execution script based on the received parameter information. The function execution script is a program for executing a function according to the parameter information. Then, by executing the function execution script, it is possible to achieve the function according to the parameter information. Specific contents of the parameter information will be described later with reference to FIG. 2. Further, specific contents of the function execution script will be described later with reference to FIG. 5.

In the illustrative embodiment, the parameter information includes a script described in a script language, more specifically, a script (hereinafter, which may be referred to as a "Lua script") described in Lua as a script language. As will be described later, the parameter information is generated by the mobile terminal device 7 and written into the card 5 from the mobile terminal device 7.

The template data 27 is standardized information that is used for generating a function execution script and includes contents complying with the function execution script. The function execution script is generated based on the template data 27. Specifically, the function execution script is generated by adding necessary information to the template data 27. Specific contents of the template data 27 will be described later with reference to FIG. 6.

The authentication information 28 includes one or more card IDs, which include a specific card ID of the card 5 authorized to be used to execute the particular function in response to the card 5 being brought in proximity to the MFP 3. Further, each card ID included in the authentication information 28 is associated with information indicating a type of a function authorized to be executed with the card ID.

The wireless communication interface 13 is configured to perform wireless communication in accordance with a wireless communication protocol different from the NFC protocol. In the illustrative embodiment, for instance, the wireless communication interface 13 performs wireless communication via a wireless LAN complying with IEEE802.11 standards.

The image scanner 14 is configured to scan an image of a document and generate image data based on the scanned image, under control by the controller 11. The scanning function is implemented using the image scanner 14. The printer 15 is configured to print on a recording medium an image based on image data, under control by the controller 11. The printing function is implemented using the printer 15.

In the illustrative embodiment, the display 16 includes a liquid crystal display device. The display 16 is configured to display thereon various screens. The user interface 17 includes a plurality of operable keys and a touchscreen.

(3) Configuration of Card

The card 5 includes a control circuit 31, a memory 32, and an NFC interface 33. The NFC interface 33 is configured to perform NFC communication with external NFC devices. The memory 32 stores therein the parameter information and the card ID.

The card 5 of the illustrative embodiment is a passive type card without an electric power supply for driving itself. In the illustrative embodiment, when the NFC interface 33 of the card 5 receives radio waves for NFC communication from an NFC device, the control circuit 31 is driven by the received radio waves.

When driven by the radio waves received by the NFC interface 33, the control circuit 31 reads the parameter information and the card ID stored in the memory 32, and transmits the parameter information and the card ID to the MFP 3 via the NFC interface 33.

After being converted into NDEF-format data, the parameter information and the card ID are transmitted to the MFP 3 via the NFC interface 33. "NDEF" is an abbreviated form of "NFC Data Exchange Format" that is defined as a data format for NFC data communication. Hereinafter, the parameter information and the card ID to be transmitted in the NDEF format may be collectively referred to as "NDEF information."

It is noted that the card 5 is not limited to a passive type card. The card 5 may be an active type card with an electric power supply incorporated therein.

(4) Configuration of Mobile Terminal Device

For example, the mobile terminal device 7 may be a smartphone, a cellular phone, or a tablet terminal. In the illustrative embodiment, the mobile terminal device 7 includes a controller 41, an NFC interface 42, a line connection interface 43, a display 44, a user interface 45, and a sound input/output interface 46.

The controller 41 includes a known microcomputer including a CPU 51 and a storage 52. The storage 52 includes one or more semiconductor memories such as a RAM, a ROM, and a flash memory. Functions of the controller 41 are implemented when the CPU 51 executes one or more programs stored in the storage 52.

The storage 52 stores programs and data for implementing the functions of the mobile terminal device 7. The programs stored in the storage 52 include a parameter information generating program 56.

The parameter information generating program 56 generates parameter information in accordance with user input operations. The generated parameter information is temporarily stored in the storage 52. In response to the card 5 being brought in proximity to the mobile terminal device 7, the parameter information stored in the storage 52 is transmitted to the card 5 via the NFC interface 42 and stored into the memory 32 of the card 5.

The NFC interface 42 is configured to perform NFC communication with external NFC devices. The line connection interface 43 is configured to perform voice communication or data communication, e.g., via a cellular phone network (not shown).

In the illustrative embodiment, the display 44 includes a liquid crystal display device. The display 44 is configured to display thereon various screens. The user interface 45 includes operable keys and a touchscreen. The operable keys include mechanical keys provided at a housing of the mobile terminal device 7. The operable keys are configured to accept setting values and instructions from a user. The touchscreen is superposed on a liquid crystal display screen of the display 44. The sound input/output interface 46 includes a microphone and a speaker.

(5) Details about Parameter Information

Figure 2:
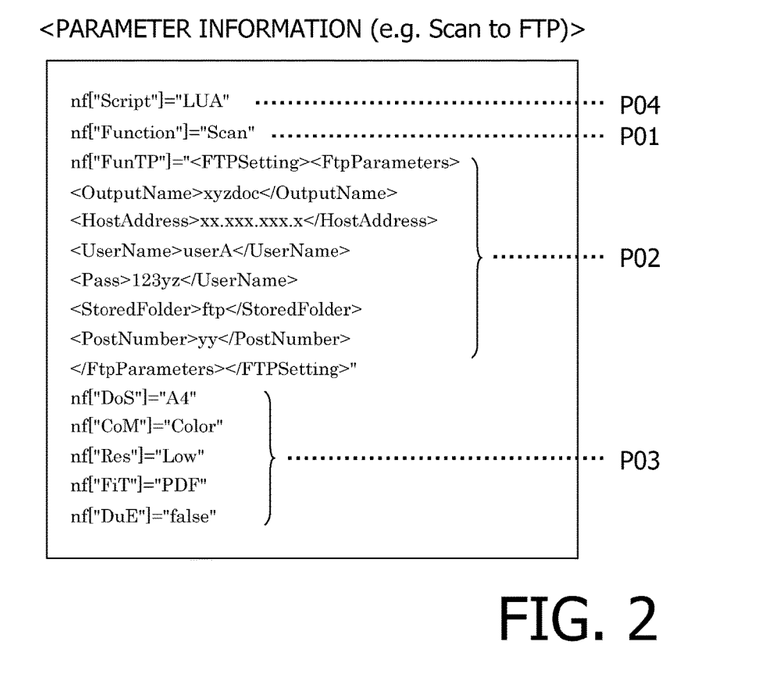
FIG. 2 exemplifies parameter information in the illustrative embodiment according to one or more aspects of the present disclosure.

FIG. 2 exemplifies parameter information to be generated by the parameter information generating program 56 of the mobile terminal device 7 and written into the memory 5 of the card 5. More specifically, the parameter information is generated when the CPU 51 of the mobile terminal device 7 executes the parameter information generating program 56. The parameter information exemplified in FIG. 2 is for implementing the scanning function of the plurality of functions of the MFP 3. More specifically, the parameter information is for implementing a function "Scan to FTP" of the scanning function.

As exemplified in FIG. 2, the parameter information includes function information P01. The function information P01 is a parameter indicating a function to be executed. FIG. 2 shows an example in which the scanning function is set as a function to be executed, in the function information P01.

Further, as shown in FIG. 2, the parameter information of the illustrative embodiment includes function detailed information P02. In the illustrative embodiment, the parameter information has related function information as the function detailed information P02. The related function information is a parameter that indicates a related function to be executed among a plurality of related functions into which the function indicated by the function information P01 is finely classified. Specifically, the first tag following "nf["Fun TP"]=" is what is here referred to as the related function information. In FIG. 2, the first tag following "nf["Fun TP"]=" is <FTPSetting><FtpParameters>, which indicates "Scan to FTP" that is one of a plurality of scan-related functions of the scanning function. "Scan to FTP" is a function to scan an image, transmit image data based on the scanned image to an FTP server (not shown), and store the image data into the FTP server.

Functions executable by the MFP 3 are roughly classified into a plurality of types of functions such as the scanning function, the printing function, and a copy function. One of the plurality of types of functions may be set as the function information P01 in the parameter information.

Further, for instance, the scanning function of the aforementioned functions may be further classified into a plurality of scan-related functions. One of the plurality of scan-related functions is the aforementioned "Scan to FTP."

The aforementioned "Scan to FTP" is shown in FIG. 2, as just an example of the scan-related functions. For instance, the scan-related functions include "Scan to OCR" and "Scan to E-mail" as well as "Scan to FTP." The above "Scan to OCR" is a function to convert scanned image data into text data and store the text data into a particular storage destination. The above "Scan to E-mail" is a function to transmit an e-mail with scanned image data attached thereto. One of the plurality of scan-related functions may be set as the related function information in the function detailed information P02 of the parameter information.

Further, as shown in FIG. 2, the function detailed information P02 includes processing method information as well as the aforementioned related function information. The processing method information is a parameter indicating how to specifically process scanned image data. The processing method information includes a file name, a server address, a user name, a password, a transfer destination folder, and a port number.

The file name is information described after a tag <OutputName> and indicating a file name of scanned image data. FIG. 2 exemplifies "xyzdoc" as the file name.

The server address is information described after a tag <HostAddress> and indicating an address of a server to which the scanned image data is to be transmitted. FIG. 2 exemplifies an IP address "xx.xxx.xxx.x" of the server as the server address.

The user name is information described after a tag <UserName> and indicating a user of the card 5. FIG. 2 exemplifies "userA" as the user name. The password is information described after a tag <Pass> and is an arbitrary value set by the user of the card 5 or an administrator.

The transfer destination folder is information described after a tag <StoredFolder> and indicating which folder of the server as a transmission destination the scanned image data is to be stored into. FIG. 2 exemplifies a folder "ftp" in the server as the transfer destination folder. The port number is information described after a tag <PortNumber> and indicating a port number as a transmission destination of the image data in the server. FIG. 2 exemplifies "yy" as the port number.

Further, as shown in FIG. 2, the parameter information of the illustrative embodiment includes setting value information P03. The setting value information P03 includes a setting value for each of setting items. The setting value information P03 is a parameter necessary for implementing the function indicated by the function information P01 or the function indicated by the related function information. FIG. 2 shows an example in which respective setting values are set for five setting items, i.e., a document size, a color mode, a resolution, a file format, and a double-side scanning, as the setting value information P03 for the scanning function to be executed (more specifically, as the setting value information P03 for "Scan to FTP").

Namely, FIG. 2 shows an example in which A4 size is set as a document size parameter. The document size parameter is a setting value indicating a size of the document to be scanned. Specifically, "A4" is set for a document size key "DoS" representing the document size parameter. As settable document sizes, various sizes may be cited such as A3 size, B4 size, B5 size, L-type size, and post card size, as well as A4 size.

Further, FIG. 2 shows an example in which "Color" is set as a color mode parameter. The color mode parameter is a setting value indicating a color mode for scanning. Specifically, "Color" is set for a color mode key "CoM" representing the color mode parameter. When the color mode is set to "Color," the image of the document is scanned as a color image, and color image data is acquired. For instance, color modes settable by the color mode parameter include "Monochrome" as well as "Color." When the color mode is set to "Monochrome," monochrome image data is acquired.

Further, FIG. 2 shows an example in which a low resolution is set as a resolution parameter. The resolution parameter is a setting parameter indicating a resolution for scanning. Specifically, "Low" is set for a resolution key "Res" representing the resolution parameter. As resolutions settable by the resolution parameter, various resolutions may be cited such as a middle resolution and a high resolution, as well as the low resolution. As another option, specific numerical values may be set such as 100 dpi, 200 dpi, 300 dpi, and 600 dpi.

Further, FIG. 2 shows an example in which PDF is set as a file format parameter. The file format parameter is a setting value indicating a file format for storing scanned image data. Specifically, "PDF" is set for a file format key "FiT" representing the file format parameter. As file formats settable by the file format parameter, various formats may be cited such as JPEG, TIFF, HTML, and TEXT, as well as PDF. Needless to say, the aforementioned file formats are just examples.

Further, FIG. 2 shows an example in which "double-side scanning off" is set as a double-side scanning parameter (i.e., a mode to prevent double-side scanning is set). The double-side scanning parameter is a setting value indicating whether to implement a function to scan a double-side printed document in a single scanning operation. Specifically, "false" is set for a double-side scanning key "DuE" representing the double-side scanning parameter. When double-side scanning is performed, "double-side scanning on" is set as the double-side scanning parameter. Specifically, "true" is set for the double-side scanning key "DuE."

The aforementioned five setting items cited as setting items of the setting value information P03 are just examples. The number and kinds of the setting items may be determined as needed. Further, as shown in FIG. 2, the parameter information of the illustrative embodiment includes attribute information P04. The attribute information P04 indicates that the parameter information is a Lua script.

It is possible to generate the parameter information as exemplified in FIG. 2, by executing the parameter information generating program 56 of the mobile terminal device 7. In the mobile terminal device 7, in response to a particular launching operation to launch the parameter information generating program 56 being performed, the CPU 51 of the mobile terminal device 7 reads the parameter information generating program 56 from the storage 52, and executes the parameter information generating program 56.

Figure 3:
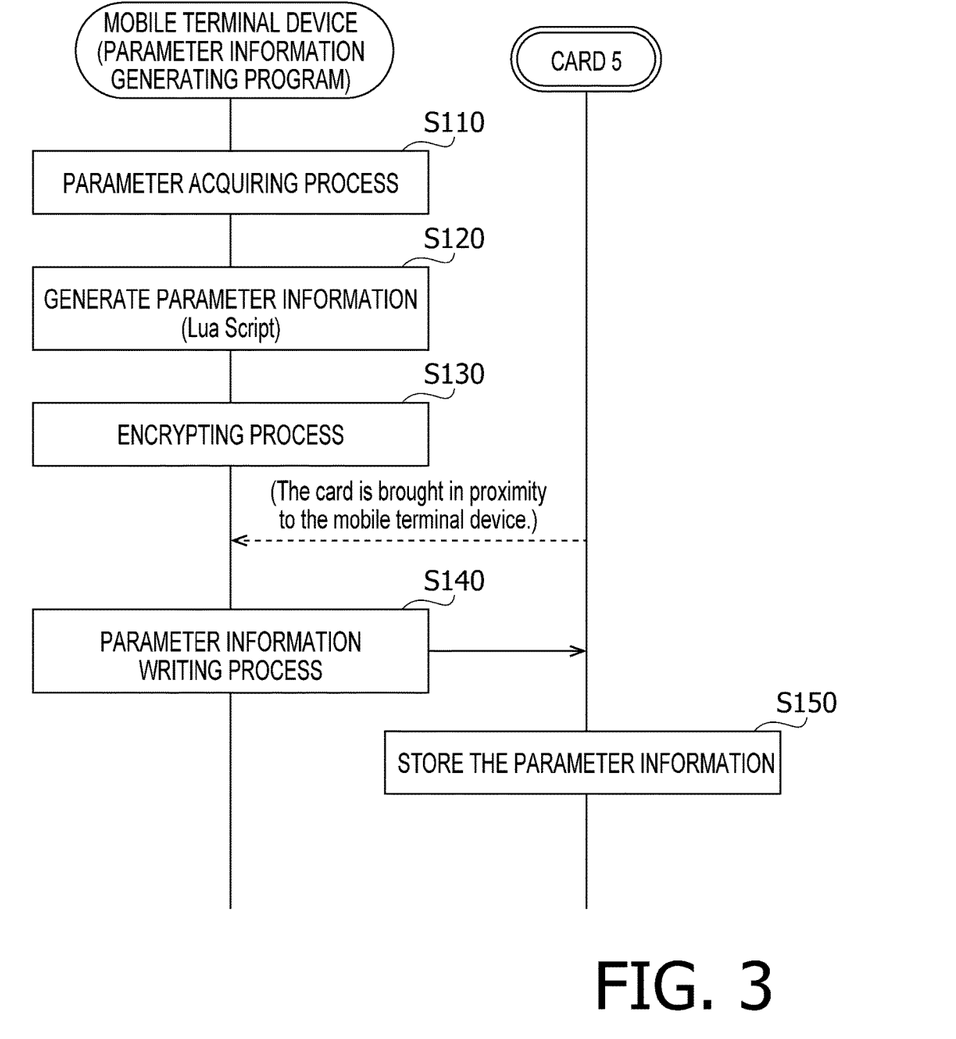
FIG. 3 is a sequence diagram showing a procedure for generating the parameter information and writing the parameter information into a card, in the illustrative embodiment according to one or more aspects of the present disclosure.

FIG. 3 is a sequence diagram showing a procedure of generation of the parameter information when the CPU 51 executes the parameter information generating program 56. As shown in FIG. 3, when the parameter information generating program 56 is launched, the CPU 51 of the mobile terminal device 7 performs a parameter acquiring process in S110.

Figure 4:
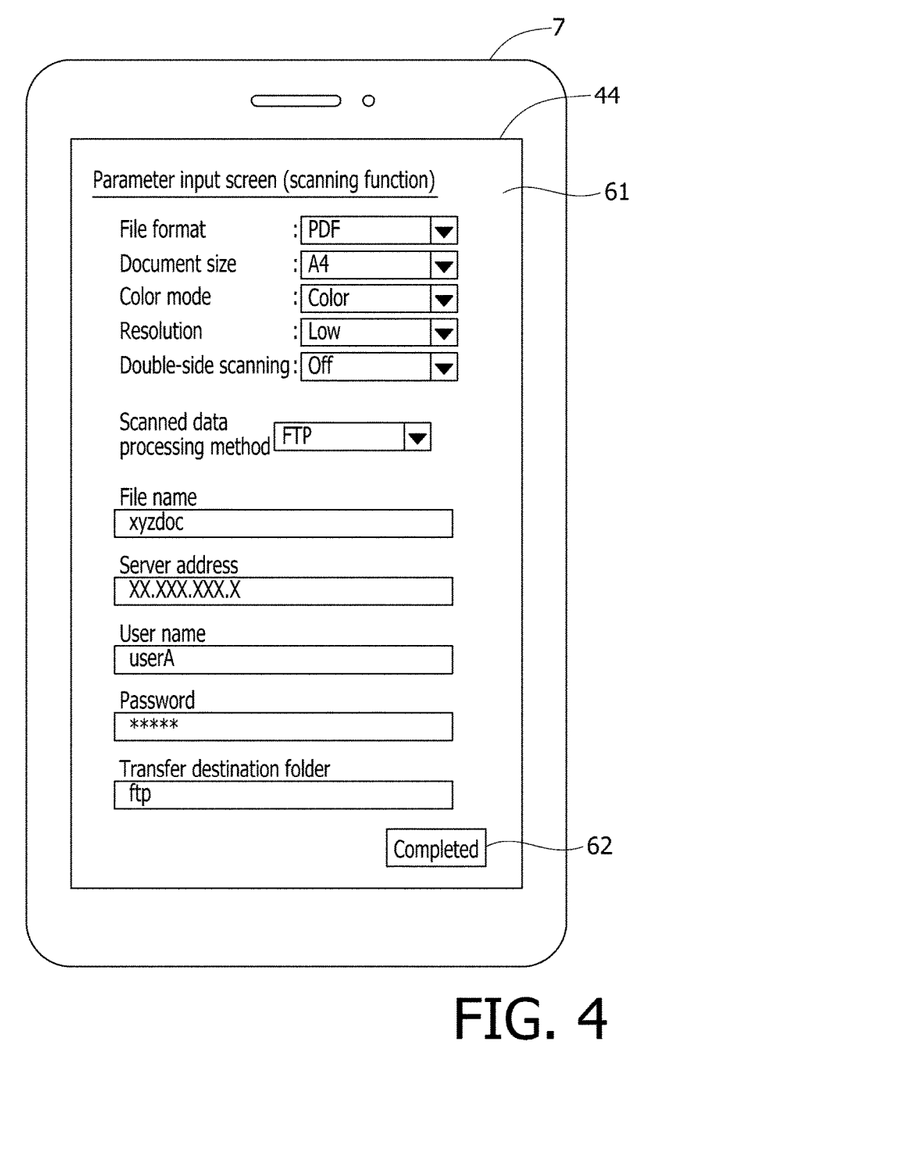
FIG. 4 exemplifies a parameter input screen to be displayed on a mobile terminal device, in the illustrative embodiment according to one or more aspects of the present disclosure.

Specifically, the CPU 51 displays a parameter input screen 61 as shown in FIG. 4, on the display 44 of the mobile terminal device 7, and accepts input of various kinds of information necessary for generating the parameter information.

The user is allowed to select intended options for the file format, the document size, the color mode, the resolution, the double-side scanning, and the processing method for processing scanned data, via the parameter input screen 61. Further, the user is allowed to input a file name, a server address, a user name, a password, and a transfer destination folder, via the parameter input screen 61.

Namely, through the parameter input screen 61, the user is allowed to input various kinds of information necessary for generating the parameter information shown in FIG. 2. Then, after the various kinds of information are input, in response to a completion button 62 being tapped, in S120, the CPU 51 generates the parameter information based on the input various kinds of information. The parameter information generated here is the Lua script described in the Lua script language. Then, in S130, the CPU 51 performs an encrypting process of encrypting the generated parameter information, and stores the encrypted parameter information into the storage 52.

Afterward, in response to the card 5 being brought in proximity to the mobile terminal device 7, in S140, the CPU 51 performs a parameter information writing process. Specifically, the CPU 51 transmits the parameter information stored in the storage 52 to the card 5 via the NFC interface 42.

In the card 5, in response to receiving the parameter information from the mobile terminal device 7 via the NFC interface 33, the control circuit 31 stores the received parameter information into the memory 32 (S150).

The parameter input screen 61 exemplified in FIG. 4 is for generating the parameter information for the scanning function. A parameter input screen 61 is prepared for each function. Therefore, the user is allowed to selectively display a parameter input screen 61 corresponding to an intended function that the user wishes to execute.

(6) Details about Template Data and Function Execution Script

Figure 6:
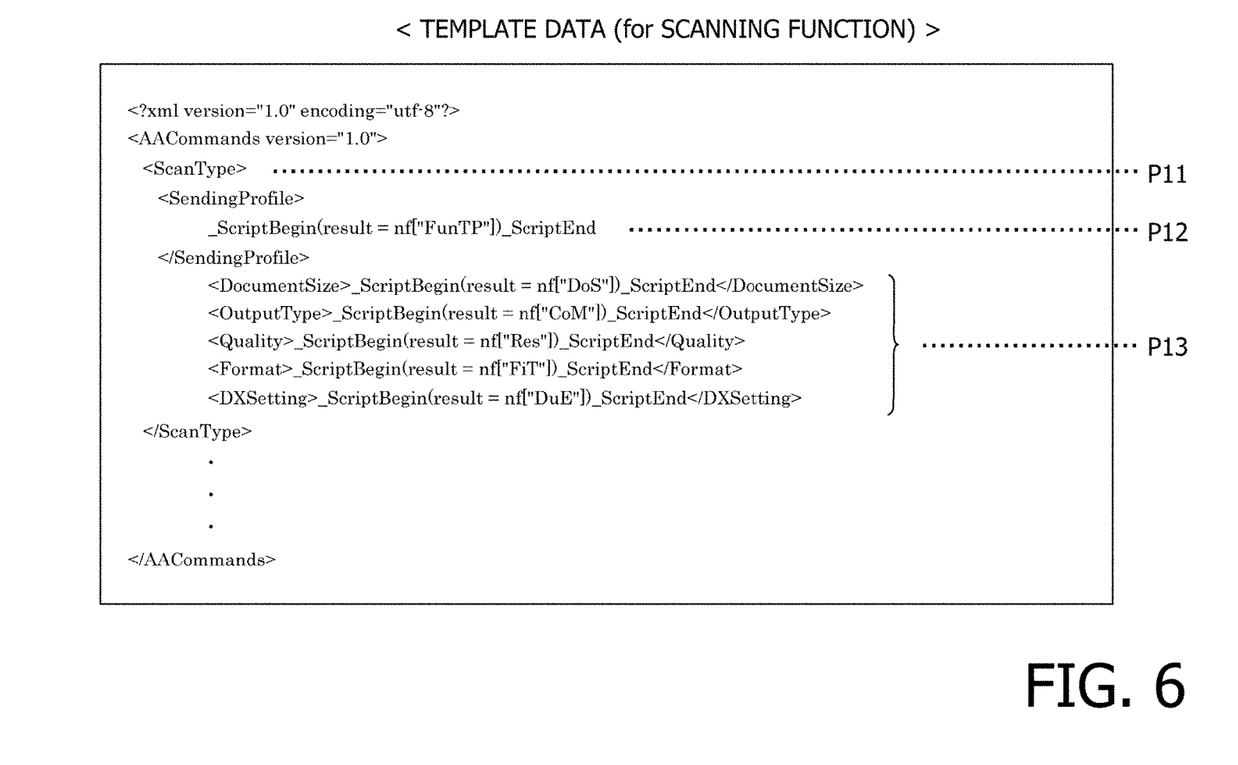
FIG. 6 exemplifies template data in the illustrative embodiment according to one or more aspects of the present disclosure.

The template data 27 stored in the storage of the MFP 3 is data that serves as an original form or a preset format for generating the function execution script based on the parameter information received from the card 5.

Figure 5:
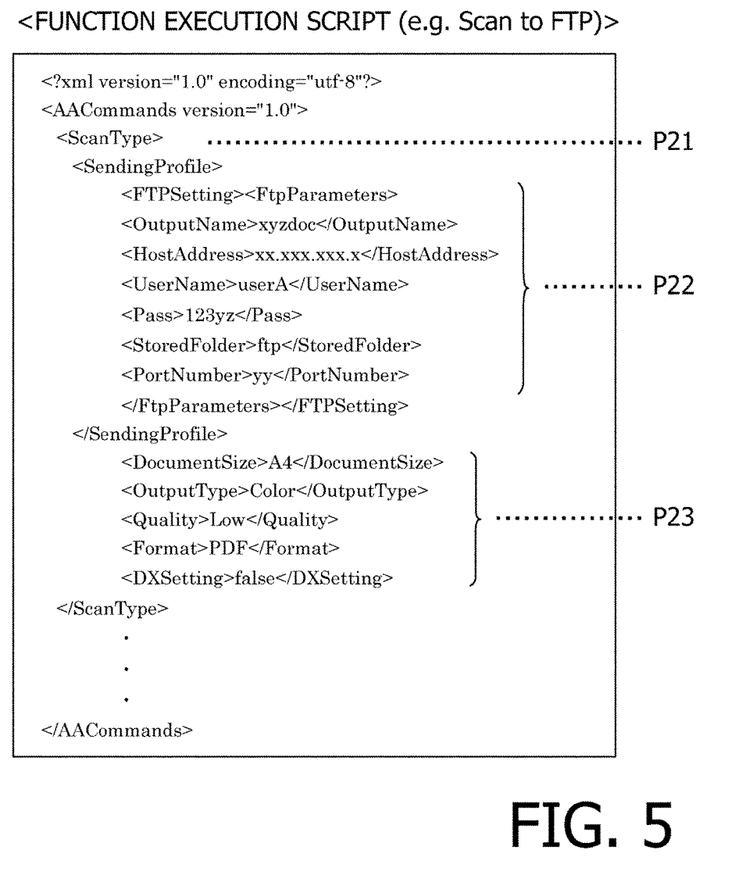
FIG. 5 exemplifies a function execution script in the illustrative embodiment according to one or more aspects of the present disclosure.

Before describing the template data 27, an explanation will be provided of a finally generated function execution script, with reference to FIG. 5. As exemplified in FIG. 5, the function execution script of the illustrative embodiment is XML data. In particular, FIG. 5 shows an example of the function execution script for executing "Scan to FTP" of the scanning function. More specifically, FIG. 5 shows an example of the function execution script generated based on the parameter information exemplified in FIG. 2.

As shown in FIG. 5, the function execution script includes a function tag P21 that indicates a function to be executed. In the example of FIG. 5, the function tag P21 is <ScanType>. Namely, in the example, the function tag P21 represents that the function to be executed is the scanning function. The function tag P21, which indicates the scanning function, is set based on that the function information P01 of the parameter information received from the card 5 indicates the scanning function.

Further, the function execution script includes function detailed information P22. The function detailed information P22 includes related function information and processing method information. The related function information indicates which function is to be executed among the plurality of scan-related functions of the scanning function. The processing method information indicates how to specifically process scanned image data.

The related function information of the function detailed information P22 is indicated by a first tag of the function detailed information P22. As exemplified in FIG. 5, the first tag of the function detailed information P22 is <FTPSetting><FtpParameters>, and indicates that a function to be executed among the plurality of scan-related functions is "Scan to FTP." The related function information, which indicates "Scan to FTP," is set based on that in the function detailed information P02 of the parameter information received from the card 5, the related function information is set to "Scan to FTP."

Further, the processing method information of the function detailed information P22 is set in accordance with the processing method information included in the function detailed information P02 received from the card 5. Generally, the processing method information received from the card 5 is set as it is as the processing method information of the function detailed information P22 of the function execution script.

Namely, to the function detailed information P22 of the function execution script, the function detailed information P02 of the parameter information received from the card 5 is applied substantially as it is.

Further, the function execution script includes setting value information P23. The setting value information P23 indicates a setting value for each of various setting items necessary for implementing the function to be executed. Specifically, a document size parameter is described after a tag <DocumentSize>. A color mode parameter is described after a tag <OutputType>. A resolution parameter is described after a tag <Quality>. A file format parameter is described after a tag <Format>. A double-side scanning parameter is described after a tag <DXSetting>. Each setting value is set in accordance with the setting value information P03 included in the parameter information received from the card 5. Each setting value set in the setting value information P23 shown in FIG. 5 is the same as a corresponding setting value set in the setting value information P03 of the parameter information shown in FIG. 2.

When the function execution script shown in FIG. 5 is executed by the MFP 3, document scanning is performed in accordance with the setting value information P23. Thereby, image data in a PDF format is generated. Then, the generated image data is processed in accordance with the function detailed information P22. Specifically, in the case of the function detailed information P22 exemplified in FIG. 5, the image data generated by the document scanning is provided with a file name "xyzdoc," and transmitted to a port "yy" of an FTP server identified by an IP address "xx.xxx.xxx.x." Then, the image data is stored into a folder "ftp" of the FTP server. It is noted that the access to the FTP server is achieved using a user name and a password.

Next, an explanation will be provided of the template data 27 to be used in generating the function execution script exemplified in FIG. 5. The template data 27 stored in the storage of the MFP 3 is standardized data as a prescribed form to be used to generate the function execution script.

In the illustrative embodiment, the template data 27 is individually prepared for each function. In other words, the template data 27 is prepared individually for each of functions executable by the MFP 3 such as the scanning function, the printing function, and the copy function.

FIG. 6 shows an example of the template data 27 prepared for the scanning function. The template data 27 for the scanning function includes a description of function detailed insertion information P12 in an area corresponding to the function detailed information P22 of the function execution script shown in FIG. 5. The template data 27 for the scanning function further includes a description of setting value insertion information P23 in an area corresponding to the setting value information P23 of the function execution script shown in FIG. 5.

Although the template data 27 is XML data as a whole, the function detailed insertion information P12 and the setting value insertion information P13 are described in the Lua script language.

Specifically, in the template data 27 shown in FIG. 6, "ScriptBegin" of the function detailed insertion information P12 indicates where a Lua script begins, and "ScriptEnd" of the function detailed insertion information P12 indicates where the Lua script ends. Further, "result=nf["FunTP"]" described between "ScriptBegin" and "ScriptEnd" represents that the function detailed information P02 included in the parameter information read out of the card 5 should be inserted here.

Further, in the setting value insertion information P13 as well, for each of the five setting items, insertion information for inserting a setting value read out of the card 5 is described. For instance, insertion information described in a line beginning with "<DocumentSize>," i.e., "result=nf ["DoS"]" represents that a setting value indicating the document size should be inserted in this line.

Namely, the template data 27 corresponding to the scanning function may be regarded as a function execution script in which various kinds of information are undetermined, i.e., a function execution script in an incomplete state before various kinds of information included therein are set.

When receiving from the card 5 the parameter information exemplified in FIG. 2 in response to the card 5 being brought in proximity to the MFP 3, the CPU 21, which is executing the automatic function execution program 26, acquires from the storage 22 the template data 27 corresponding to the scanning function, based on that the parameter information is for the scanning function. Then, from the template data 27 and the parameter information acquired from the card 5, the CPU 21 generates a function execution script with the parameter information incorporated in the template data 27. In the illustrative embodiment, from the template data 27 exemplified in FIG. 6 and the parameter information exemplified in FIG. 2, the function execution script exemplified in FIG. 5 is generated. After generating the function execution script, by executing the generated function execution script, the CPU 21 implements the function indicated by the function execution script.

With respect to the other functions as well as the scanning function, individual template data 27 corresponding to each of the other functions is prepared. When the parameter information acquired from the card 5 is for a particular function other than the scanning function, the CPU 21 executing the automatic function execution program 26 acquires from the storage 22 the template data 27 corresponding to the particular function, and generates a function execution script using the parameter information.

(7) Process by Automatic Function Execution Program

Subsequently, an explanation will be provided of a function execution process to be implemented by the CPU 21 of the MFP 3 executing the automatic function execution program 26 when the card 5 is brought in proximity to the MFP 3, with reference to FIG. 7.

When the NDEF information is transmitted by the card 5 in response to the card 5 being brought in proximity to the MFP 3, and is input into the MFP 3 via the NFC interface 12, the CPU 21 of the MFP 3 reads the automatic function execution program 26 from the storage 22 and executes the automatic function execution program 26.

The automatic function execution program 26 includes an NFC processing module, a function management module, a command generating module, and a command processing module. The NFC processing module is a program module configured to process the NDEF information acquired from the card 5. The function management module is a program module configured to perform an authentication process based on the card ID included in the NDEF information. The command generating module is a program module configured to generate a function execution script. The command processing module is a program module configured to perform a process according to the function execution script.

When each individual program module is executed, a function corresponding to the program module in execution is performed. The following description will be provided under assumptions that the CPU 21 executing the NFC processing module serves as an NFC processor, that the CPU 21 executing the function management module serves as a function manager, that the CPU 21 executing the command generating module serves as a command generator, and that the CPU 21 executing the command processing module serves as a command processor.

Figure 7:
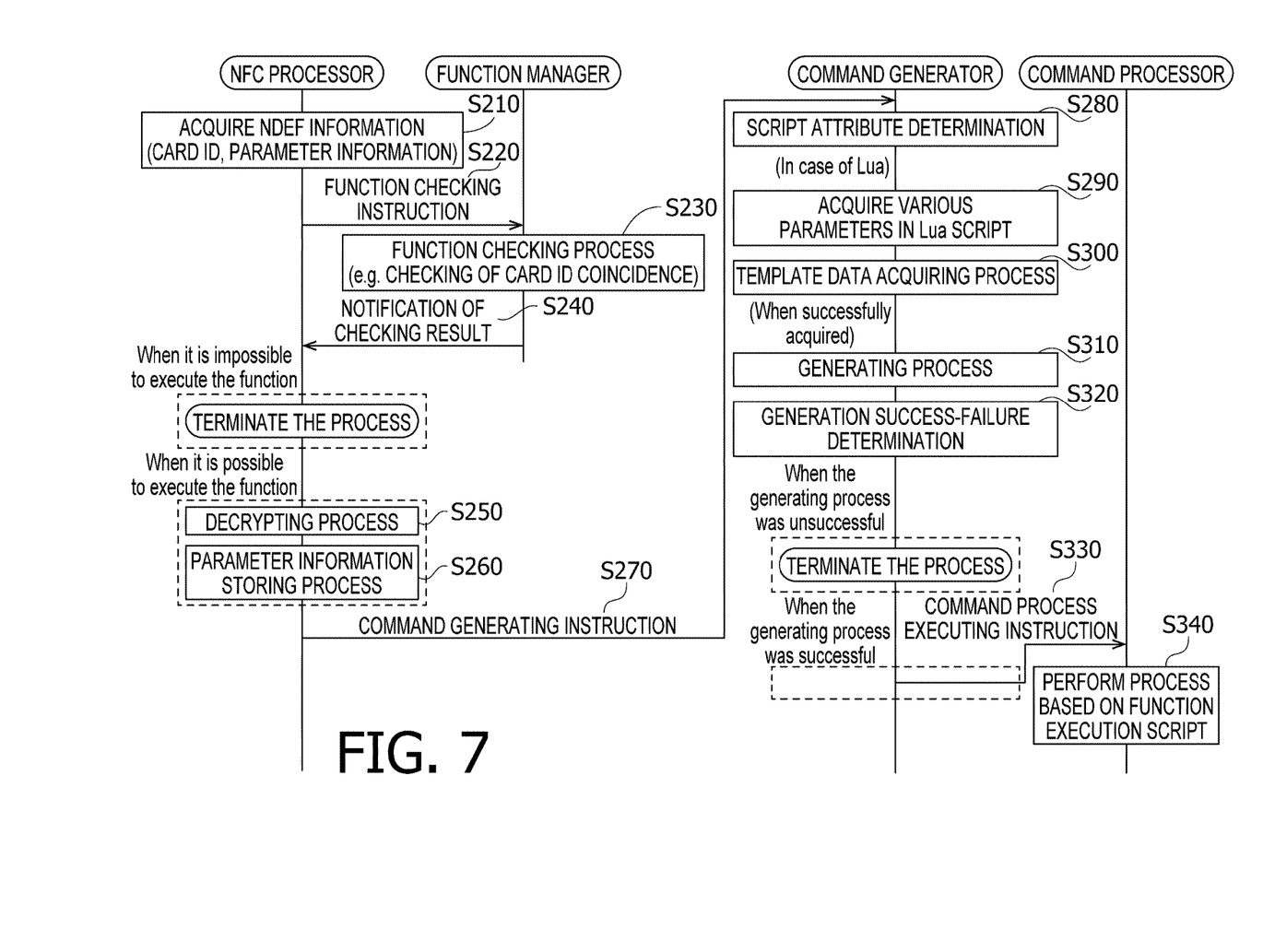
FIG. 7 is a sequence diagram showing a procedure of a sleep recovery process in the illustrative embodiment according to one or more aspects of the present disclosure.

After the automatic function execution program 26 is launched, as shown in FIG. 7, the NFC processor receives the NDEF information via the NFC interface 12 (S210). As described above, the NDEF information includes the card ID and the parameter information.

In response to receiving the NDEF information, the NFC processor issues a function checking instruction to the function manager (S220). Specifically, the NFC processor transmits the card ID included in the NDEF information to the function manager, and requests the function manager to perform a function checking process based on the card ID.

In response to receiving the function checking instruction from the NFC processor, the function manager performs the function checking process (S230). Specifically, the function manager checks whether the card ID received from the NFC processor is coincident with the card ID included in the authentication information 28. Then, the function manager provides a notification of a checking result to the NFC processor (S240).

It is noted that, in the function checking process of S230, the function manager may also check whether a function indicated by the function information or the function detailed information included in the parameter information is set as a function usable with the card ID, in the authentication information 28.

In response to receiving the notification of the checking result from the function manager, the NFC processor performs a process corresponding to the notification. Specifically, when the card ID included in the NDEF information is not included in the authentication information 28, the NFC processor determines that it is impossible to execute the function based on the received NDEF information, and terminates the automatic function execution program 26 in execution.

Meanwhile, when the card ID included in the NDEF information is included in the authentication information 28, the NFC processor determines that it is possible to execute the function based on the received NDEF information. In this case, the NFC processor performs a decrypting process (S250). In the decrypting process, the NFC processor decrypts the encrypted parameter information included in the NDEF information and acquires the original parameter information before the encrypting process (see S130).

In S260, the NFC processor stores into the storage 22 the parameter information decrypted in S250. Then, in S270, the NFC processor issues a command generating instruction to the command generator. The "command" referred to here denotes a function execution script. Namely, the command generating instruction is an instruction to generate a function execution script.

In response to receiving the command generating instruction from the NFC processor, the command generator makes an attribute determination (S280). Specifically, the command generator reads the parameter information stored in the storage (see S260) and determines whether the parameter information is a Lua script. This attribute determination may be made based on the attribute information P04 included in the parameter information.

As a result of the attribute determination in S280, when the read parameter information is not a Lua script, the command generator terminates the automatic function execution program 26 in execution. Meanwhile, when the read parameter information is a Lua script, the command generator goes to S290.

In S290, the command generator acquires various parameters in the Lua script. Specifically, the command generator acquires parameters included in each of the function information P01, the function detailed information P02, and the setting value information P03 in the Lua script.

In S300, the command generator acquires template data 27 from the storage 22. Specifically, the command generator specifies a function to be executed, based on the function information P01 acquired from the parameter information. Then, the command generator acquires from the storage 22 template data 27 corresponding to the specified function. For instance, when the function information P01 indicates the scanning function, the command generator acquires from the storage 22 the template data 27 corresponding to the scanning function.

In S300, when the template data 27 corresponding to the function indicated by the function information P01 is not stored in the storage 22, the command generator terminates the automatic function execution program 26 in execution. When successfully acquiring from the storage 22 the template data 27 corresponding to the function indicated by the function information P01, the command generator goes to S310.

In S310, the command generator performs a generating process. Specifically, in the generating process, the command generator allocates the various parameters acquired in S290 to the template data 27 acquired in S300, and generates a function execution script with the various parameters allocated to the template data 27.

In S320, the command generator makes a generation success-failure determination as to whether the generating process has been successfully done. For instance, the generation success-failure determination may be made based on whether a setting value is set for each of the setting items in the generated function execution script. When there is at least one setting item without any setting value set therefor, the command generator may determine that the generating process has ended in failure. For instance, as examples of the case where there is at least one setting item without any setting value set therefor, various cases may be cited such as a case where there is not any file name set after the tag <OutputName> and a case where there is not any color mode set after the tag <OutputType>. Meanwhile, when a setting value is set for every setting item, the command generator determines that the generating process has been successfully done. The function execution script exemplified in FIG. 5 is a successfully-generated function execution script.

In the generation success-failure determination in S320, when determining that the generating process has ended in failure, the command generator terminates the automatic function execution program 26 in execution. Meanwhile, when determining that the generating process has been successfully done, the command generator issues a command process executing instruction to the command processor (S330).

In response to receiving the command process executing instruction from the command generator, the command processor executes the generated function execution script and performs a process based on the function execution script (S340). Thereby, the function specified by the function execution script is implemented.

(8) Advantageous Effects of Illustrative Embodiment

According to the illustrative embodiment described above, the following advantageous effects are provided. In response to the card 5 with the parameter information stored therein being brought in proximity to the MFP 3, the MFP 3 acquires the parameter information from the card 5, and the function according to the parameter information is automatically performed. Specifically, the function execution script is generated based on the parameter information acquired from the card 5 and the template data 27 stored in the MFP 3. Then, when the generated function execution script is executed, the function according to the parameter information is performed.

Therefore, a user who wishes to execute a particular function in a specific execution method is allowed to, when the parameter information corresponding to the specific execution method is previously registered in the card 5, execute the particular function only by bringing the card 5 in proximity to the MFP 3. Thus, the user is allowed to easily cause the MFP 3 to execute the particular function in the specific execution method.

As one of possible configurations, such a configuration is considered that the function execution script itself is stored in the card 5, and the MFP 3 executes the function in response to receiving the function execution script from the card 5. However, according to this configuration, the card 5 is required to store a larger amount of data, and the larger amount of data has to be transmitted from the card 5 to the MFP 3 in response to the card 5 being brought in proximity to the MFP 3.

In contrast, according to the illustrative embodiment, the information for generating the function execution script is separated into two pieces of information, i.e., the parameter information and the template data 27. The parameter information is stored in the card 5 while the template data 27 is stored in the MFP 3. Therefore, it is possible to reduce an amount of data to be transmitted from the card 5 to the MFP 3.

Further, as one of methods for causing the MFP 3 to easily execute a particular function, a method has been known in which settings for the particular function to be executed are previously registered in a shortcut key, and the particular function is executed in accordance with the registered settings via the shortcut key. However, according to the method using the shortcut key, as the number of functions that the user wishes to execute increases, the number of registered shortcut keys increases. Accordingly, a larger processing load and/or a larger memory area are required for the shortcut registration. Furthermore, as the number of the registered shortcut keys increases, a load placed on the user who attempts to search for an intended shortcut key increases.

In contrast, according to the illustrative embodiment, it is possible to cause the MFP 3 to easily and automatically execute a particular function without registering a shortcut key for the particular function at the side of the MFP 3. Further, the template data 27 is standardized information that complies with a function execution script and is equivalent to a function execution script in which the setting values are undetermined. In addition, a function execution script is generated by allocating to the template data 27 the parameter information acquired from the card 5.

Thus, the function execution script is generated in such an easy manner as to allocate the parameter information acquired from the card 5 to the template data 27 in which the setting values are undetermined. Therefore, it is possible to reduce a processing load for generating the function execution script.

Further, the template data 27 is prepared individually for each function. In order to generate the function execution script, the automatic function execution program 26 uses the template data 27 for the function indicated by the parameter information acquired from the card 5. Therefore, it is possible to efficiently generate the function execution script corresponding to the function to be executed.

Further, the NDEF information acquired from the card 5 includes the card ID for authentication. Additionally, the automatic function execution program 26 performs the function checking process based on the card ID, in an attempt to generate the function execution script. Then, in response to successful authentication, the automatic function execution program 26 generates the function execution script.

According to the aforementioned configuration, for instance, an administrator of the MFP 3 is allowed to authorize only a particular user to cause the MFP 3 to execute a particular function with the card 5. Further, the administrator of the MFP 3 is allowed to restrict executable functions individually for each card ID. Thereby, even though a plurality of users use the MFP 3 with respective cards 5, the administrator of the MFP 3 is allowed to manage the use of the MFP 3 in a manner appropriate for each individual user.

Further, after generation of the function execution script, the automatic function execution program 26 determines whether the function execution script has been normally generated, i.e., whether the function execution script has been successfully generated based on the template data 27 and the parameter information.

Therefore, it is possible to prevent an unsuccessfully-generated function execution script from being executed. Thus, it is possible to avoid occurrence of a function execution result unintended by the user. The determination as to whether the function execution script has been normally generated is made based on whether respective setting values are set for the setting items of the generated function execution script. Therefore, it is possible to easily determine whether the function execution script has been normally generated.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

[Modifications]

The parameter information shown in FIG. 2, the function execution script shown in FIG. 5, and the template data shown in FIG. 6 are just examples. Concrete contents of the function detailed information and the setting value information may be determined appropriately as needed.

The parameter information may not necessarily be a Lua script. Furthermore, the parameter information may not necessarily be a script. The parameter information may be described in various kinds of languages. The parameter information may be described in a script language different from Lua.

The template data 27 may not necessarily be XML data. The template data 27 may not necessarily include a Lua script. A data format and a language for the template data 27 may be determined appropriately as needed.

The parameter information may be generated by any other devices than the mobile terminal device 7 as long as the devices are configured to execute the parameter information generating program 56. As another option, the parameter information may be generated by other devices having the same function as the function to be implemented by executing the parameter information generating program 56.

Further, various methods may be applied with respect to how to specifically write the generated parameter information into the card 5. For instance, when a device that generates the parameter information does not have an NFC communication function, the parameter information generated by the device may be directly or indirectly (e.g., via a storage medium) transferred to another particular device configured to perform NFC communication. Then, the parameter information may be written into the card 5 from the particular device.

Namely, where to generate the parameter information and how to write the generated parameter information into the card 5 may be determined appropriately as needed.

The card 5 is just an example of an information storing device that transmits the parameter information to the MFP 3. The parameter information may be stored in a particular information storing device other than the card 5. Then, in response to the particular information storing device being brought in proximity to the MFP 3, the parameter information may be transmitted to the MFP 3. Namely, as an information storing device that transmits the parameter information to the MFP 3, various kinds of information storing devices may be used as long as the devices are configured to store the parameter information and transmit the parameter information via wireless communication in accordance with an NFC protocol.

The MFP 3 is just an example of a function execution apparatus. Aspects of the present disclosure may be applied to various kinds of function execution apparatuses configured to execute a particular function and acquire the parameter information from an information storing device such as the card 5.

A communication protocol for transmitting the NDEF information from the card 5 to the MFP 3 may be any other communication protocols than the NFC protocol exemplified in the aforementioned illustrative embodiment.

A function of a single element exemplified in the aforementioned illustrative embodiment may be implemented in a dispersed manner by a plurality of elements. Further, respective functions of a plurality of elements may be implemented in an integrated manner by a single element. Further, at least a part of a configuration exemplified in the aforementioned illustrative embodiment may be replaced with a known configuration having substantially the same function. Further, a part of a configuration exemplified in the aforementioned illustrative embodiment may be omitted. Further, at least a part of a configuration exemplified in the aforementioned illustrative embodiment may be added to another configuration exemplified in the aforementioned illustrative embodiment. Further, at least a part of a configuration exemplified in the aforementioned illustrative embodiment may be replaced with another configuration exemplified in the aforementioned illustrative embodiment.

What is claimed is:

1. A function execution system comprising:
an information storing device; and
a function execution apparatus comprising:
a first wireless communication interface configured to perform near-field wireless communication with the information storing device, using a specific near-field wireless communication protocol;
a template information storage configured to store individual template information for each of functions executable by the function execution apparatus, each individual template information including undetermined-state information in which a setting value for each of a plurality of setting items for executing a corresponding function is undetermined; and
a controller configured to:
receive setting information from the information storing device via the first wireless communication interface, the setting information including function information indicating a particular function to be executed, and a setting value for each setting item for executing the particular function;
acquire, from the template information storage, individual template information for the particular function indicated by the function information included in the received setting information;
generate function execution information by setting, for the undetermined-state information included in the acquired individual template information, the setting value for each setting item included in the received setting information; and
execute the particular function in accordance with the generated function execution information,
wherein the information storing device comprises:
a setting information storage configured to store the setting information;
a second wireless communication interface configured to perform near-field wireless communication with the function execution apparatus, using the specific near-field wireless communication protocol; and
a wireless communication processor configured to transmit the setting information stored in the setting information storage, via the second wireless communication interface,
wherein the setting information received from the information storing device is described in a specific script language,
wherein each of the template information and the function execution information includes a setting script described in a script language that is identical to the specific script language for the setting information, the setting script indicating the setting value for each of the plurality of setting items, and
wherein the controller is further configured to generate the function execution information by setting, for the setting script, the respective setting values for the plurality of setting items included in the setting information.

2. A function execution apparatus comprising:
a near-field wireless communication interface configured to perform near-field wireless communication with an information storing device;
a template information storage configured to store template information; and
a controller configured to:
receive setting information from the information storing device via the near-field wireless communication interface, the setting information including respective setting values for a plurality of setting items for executing a particular function;
generate function execution information by setting the received setting information based on the template information stored in the template information storage, the generated function execution information including the respective setting values set for the plurality of setting items in accordance with a data form of the template information; and
execute the particular function in accordance with the generated function execution information;
wherein the setting information received from the information storing device includes a specific authentication code corresponding to the setting information,
wherein the function execution apparatus further comprises an authentication information storage configured to store authentication information that associates an executable function with each individual authentication code, and
wherein the controller is further configured to:
when receiving the setting information, determine whether the specific authentication code included in the received setting information is included in the authentication information stored in the authentication information;
when determining that the specific authentication code included in the received setting information is included in the authentication information stored in the authentication information storage, determine whether the particular function based on the received setting information is an executable function associated with the specific authentication code; and
when determining that the particular function based on the received setting information is an executable function associated with the specific authentication code, generate the function execution information.

3. The function execution apparatus according to claim 2, wherein the controller is further configured to serve as a setting information receiver configured to receive the setting information, and a generator configured to generate the function execution information,
wherein the setting information receiver is further configured to, when receiving the setting information, transmit an instruction to generate the function execution information to the generator, and
wherein the generator is further configured to, when receiving the instruction from the setting information receiver, generate the function execution information.

4. The function execution apparatus according to claim 2, wherein the controller is further configured to:
determine whether the function execution information has normally been generated; and
when determining that the function execution information has normally been generated, execute the particular function in accordance with the function execution information.

5. The function execution apparatus according to claim 4, wherein the controller is further configured to:
  determine whether the function execution information has the setting value set for each of the plurality of setting items; and
  when determining that there is a setting item without the setting value set therefor, determine that the function execution information has not normally been generated.

6. The function execution apparatus according to claim 2, wherein the controller is further configured to execute at least one of a scanning function and a printing function, as the particular function executable in accordance with the function execution information, the scanning function being a function to scan an image of a document and process image data of the scanned image, the printing function being a function to print an image based on image data.

7. The function execution apparatus according to claim 2, wherein the controller comprises:
  a processor; and
  a memory storing processor-executable instructions that, when executed by the processor, cause the processor to:
    receive the setting information from the information storing device via the near-field wireless communication interface;
    generate the function execution information; and
    execute the particular function in accordance with the generated function execution information.

8. The function execution apparatus according to claim 2, wherein the template information includes undetermined-state information in which the setting value for each of the plurality of setting items is undetermined, and
wherein the controller is further configured to generate the function execution information by setting, for the undetermined-state information included in the template information, the setting value for each of the plurality of setting items included in the setting information.

9. The function execution apparatus according to claim 2, wherein the received setting information includes function information, the function information indicating the particular function to be executed,
wherein the template information storage stores individual template information for each function of the function execution apparatus, and
wherein the controller is further configured to acquire, from the template information storage, the template information for the particular function indicated by the function information included in the setting information.

10. A function execution apparatus comprising:
a near-field wireless communication interface configured to perform near-field wireless communication with an information storing device;
a template information storage configured to store template information; and
a controller configured to:
  receive setting information from the information storing device via the near-field wireless communication interface, the setting information including respective setting values for a plurality of setting items for executing a particular function;
  generate function execution information by setting the received setting information based on the template information stored in the template information storage, the generated function execution information including the respective setting values set for the plurality of setting items in accordance with a data form of the template information; and
  execute the particular function in accordance with the generated function execution information;
wherein the setting information received from the information storing device is described in a specific script language,
  wherein each of the template information and the function execution information includes a setting script described in a script language that is identical to the specific script language for the setting information, the setting script indicating the setting value for each of the plurality of setting items, and
  wherein the controller is further configured to generate the function execution information by setting, for the setting script, the respective setting values for the plurality of setting items included in the setting information.

11. The function execution apparatus according to claim 10,
wherein the template information includes undetermined-state information in which the setting value for each of the plurality of setting items is undetermined, and
wherein the controller is further configured to generate the function execution information by setting, for the undetermined-state information included in the template information, the setting value for each of the plurality of setting items included in the setting information.

12. The function execution apparatus according to claim 10,
wherein the received setting information includes function information, the function information indicating the particular function to be executed,
wherein the template information storage stores individual template information for each function of the function execution apparatus, and
wherein the controller is further configured to acquire, from the template information storage, the template information for the particular function indicated by the function information included in the setting information.

13. The function execution apparatus according to claim 10,
wherein the controller is further configured to serve as a setting information receiver configured to receive the setting information, and a generator configured to generate the function execution information,
wherein the setting information receiver is further configured to, when receiving the setting information, transmit an instruction to generate the function execution information to the generator, and
wherein the generator is further configured to, when receiving the instruction from the setting information receiver, generate the function execution information.

14. The function execution apparatus according to claim 10,
wherein the controller is further configured to:
  determine whether the function execution information has normally been generated; and
  when determining that the function execution information has normally been generated, execute the particular function in accordance with the function execution information.

15. The function execution apparatus according to claim 14,
wherein the controller is further configured to:
  determine whether the function execution information has the setting value set for each of the plurality of setting items; and when determining that there is a setting item without the setting value set therefor, determine that the function execution information has not normally been generated.

16. The function execution apparatus according to claim 10,
wherein the controller is further configured to execute at least one of a scanning function and a printing function, as the particular function executable in accordance with the function execution information, the scanning function being a function to scan an image of a document and process image data of the scanned image, the printing function being a function to print an image based on image data.

17. The function execution apparatus according to claim 10,
wherein the controller comprises:
a processor; and
a memory storing processor-executable instructions that, when executed by the processor, cause the processor to:
receive the setting information from the information storing device via the near-field wireless communication interface;
generate the function execution information; and
execute the particular function in accordance with the generated function execution information.

18. A non-transitory computer-readable medium storing computer-readable instructions that are executable by a processor coupled with a function execution apparatus comprising a near-field wireless communication interface and a template information storage configured to store individual template information for each of functions executable by the function execution apparatus, each individual template information including undetermined-state information in which a setting value for each of a plurality of setting items for executing a corresponding function is undetermined, the instructions being configured to, when executed by the processor, cause the processor to:
receive setting information from an information storing device via the near-field wireless communication interface according to a specific near-field wireless communication protocol, the setting information including function information indicating a particular function to be executed, and a setting value for each setting items for executing the particular function;
acquire, from the template information storage, individual template information for the particular function indicated by the function information included in the received setting information;
generate function execution information by setting, for the undetermined-state information included in the acquired individual template information, the setting value for each setting item included in the received setting information; and
execute the particular function in accordance with the generated function execution information,
wherein the setting information received from the information storing device is described in a specific script language,
wherein each of the template information and the function execution information includes a setting script described in a script language that is identical to the specific script language for the setting information, the setting script indicating the setting value for each of the plurality of setting items, and
wherein the controller is further configured to generate the function execution information by setting, for the setting script, the respective setting values for the plurality of setting items included in the setting information.

* * * * *